(12) United States Patent
Schreiber et al.

(10) Patent No.: US 8,214,585 B2
(45) Date of Patent: Jul. 3, 2012

(54) ENABLING PARALLEL ACCESS VOLUMES IN VIRTUAL MACHINE ENVIRONMENTS

(75) Inventors: Robert Walter Schreiber, Elkton, MD (US); Stephen Glenn Wilkins, Endwell, NY (US); John W. Yacynych, Vestal, NY (US)

(73) Assignee: International Business Machines Corporation, Armonk, NY (US)

( * ) Notice: Subject to any disclaimer, the term of this patent is extended or adjusted under 35 U.S.C. 154(b) by 883 days.

(21) Appl. No.: 11/839,007

(22) Filed: Aug. 15, 2007

(65) Prior Publication Data

US 2009/0049235 A1  Feb. 19, 2009

(51) Int. Cl.
*G06F 12/00* (2006.01)
(52) U.S. Cl. .................... 711/112; 711/E12.016
(58) Field of Classification Search .................... None
See application file for complete search history.

(56) References Cited

U.S. PATENT DOCUMENTS

| | | | | |
|---|---|---|---|---|
| 6,862,609 | B2* | 3/2005 | Merkey | 709/214 |
| 7,043,604 | B2* | 5/2006 | Ogasawara et al. | 711/114 |
| 7,171,514 | B2* | 1/2007 | Coronado et al. | 711/112 |
| 2004/0073831 | A1* | 4/2004 | Yanai et al. | 714/7 |

OTHER PUBLICATIONS

John Clyman, "Manage Multiple Operating Systems", PC Magazine, Dec. 14, 2004, pp. 1-4, http://www.pcmag.com/article2/0,2817,1730835,00.asp.*
Webopedia, "Parallel Interface", Nov. 25, 1997, pp. 1, http://web.archive.org/web/20020808031908/http://www.webopedia.com/TERM/P/parallel_interface.html.*

* cited by examiner

*Primary Examiner* — Edward Dudek, Jr.
*Assistant Examiner* — Christopher Birkhimer
(74) *Attorney, Agent, or Firm* — Karuna Ojanen; Ojanen Law Offices

(57) ABSTRACT

Parallel, coordinated, and optimized access of real Base and Alias DASDs by one or more virtual machines, each utilizing one or more virtual Base and Alias DASDs. Each of a plurality of virtual machines defines a virtual Base DASD device and a modified operating system may coordinate the virtual machine activity on real Base and Alias devices to maximize overall system throughput. In more complex embodiments, one or more virtual machines define one or more virtual Bases and associated virtual Alias devices in which case wherein the embodiments described coordinate their activity on one or more real Base and Alias devices to maximize overall system throughput.

17 Claims, 5 Drawing Sheets

SAMPLE DEDICATED PAV CONTROL BLOCK CHAIN POINTERS

ENABLING PARALLEL ACCESS VOLUMES IN VIRTUAL MACHINE ENVIRONMENTS

BACKGROUND

Field

This invention relates to the field of accessing computer storage systems, and more particularly relates to multiple real and virtual operating systems being able to access multiple storage devices in parallel.

The world today relies on information: obtaining it, writing it, storing it, accessing it, reading it, mining it, analyzing it, printing it, etc. There are entire industries created for these purposes, and inevitably, these industries require entire computerized data storage systems. Besides the data storage industry, all industries require storage of large amounts of information. In a data storage system, there may be hundreds, even thousands of different kinds of digital data storage devices or memory devices, called Direct Access Storage Devices or DASDs, for short. In a complex DASD storage subsystem, there are thousands of these DASDs, so practicably there may be several hundred gigabytes of DASD storage in a small system with a large system having on the order of exabytes of DASD storage. To efficiently access such large DASD storage systems, multiple input/output (I/O) operations must occur simultaneously. Sometimes more than ten thousand users must be able to access a storage system at the same time. Accessing encompasses reading the data from and writing data to these DASDs. Reading data from one of these thousands of DASDs can occur in parallel, but writing data to a DASD is still serialized in order to maintain coherency, i.e., ensuring that the DASD has the most up-to-date data stored.

DASD storage systems may be accessed through multiple high-capacity electronic "data pipes," called channels, that are capable of transmitting and receiving data at rates that can easily exceed 10 gigabits per second. In order to facilitate the parallel control of the flow of data through channels, channels may be accessed through portals called subchannels that are used to maintain the state and progress information for an I/O operation. Operating systems and applications typically work with subchannels to perform I/O operations, and the subchannels, in turn, work with the channels to transmit and receive data. Subchannels typically operate simultaneously through channels. Subchannels may represent multiple physical paths to a device, but only one path to a device is used at any given moment, since a subchannel may only execute one I/O operation at a time. Real operating systems perform I/O operations by using real subchannels that are implemented as part of the computer's hardware, firmware and hypervisor; these real subchannels are sometimes represented by software constructs called RDEVs, since these subchannels represent Real DEVices that exist in the physical world. Virtual machines are implemented by an operating system that simulates real devices by providing virtual devices, sometimes represented by software constructs called VDEVs. VDEVs represent a virtual machine's virtual subchannels that access abstract channels and devices that do not necessarily exist in the physical world or may exist, but in an alternate form. RDEVs and VDEVs may represent disk, tape, unit record, console, or many other types of real or imaginary devices and their subchannels. In the remainder of this patent we will be referring only to DASD RDEVs and DASD VDEVs.

A dedicated VDEV may be exclusively associated with an entire unshared RDEV. With the dedicated arrangement only one RDEV and VDEV may be associated with each other. A minidisk DASD VDEV may occupy a portion of a shared DASD RDEV. With the minidisk arrangement there may be one or more minidisk VDEVs associated with one RDEV. A minidisk, called a full-pack minidisk, may occupy an entire DASD RDEV, but this is not the same as a dedicated arrangement, since the minidisk may be shared among multiple virtual machines.

Parallel Access Volumes (PAVs) refer to DASD devices within a storage subsystem that are able to perform multiple concurrent input/output (I/O) operations. DASD storage subsystems may support PAVs and provide the ability to access a physical DASD, in parallel, with multiple DASD Base and Alias RDEVs. Without PAV support only one DASD RDEV may be used to serially access a physical DASD. In a PAV environment the primary DASD RDEV represents a real Base subchannel for a physical DASD, and the same DASD may also be accessed, in parallel, by other Alias DASD RDEVs. All the data on the DASD can be read simultaneously from the Base or any associated Alias RDEVs, but there is a limit to the number of Base and Alias RDEVs. By way of example only, a DASD can be configured as one Base and four Aliases RDEVs, so it would appear that there would be five RDEVs for one physical DASD.

To recap from a slightly different perspective, access to a PAV DASD may involve multiple RDEVs operating in parallel. Each DASD is assigned one or more RDEVs. When two or more RDEVs are assigned to a DASD, the configuration is called a Parallel Access Volume with a Base RDEV and one or more Alias RDEVs. Alias RDEVs are assigned to a Base RDEV and may not be shared with other Base RDEVs. Reassignment of an Alias RDEV to a different Base RDEV, however, is accomplished with a hardware console command or a software-initiated Perform Subsystem Function (PSF) operation to the subsystem. A plurality of Base and Alias RDEVs may exist within a DASD storage system.

Real machines (computers) execute an operating system that controls RDEVs. The operating system may be a virtualizing operating system that further defines virtual machines, VDEVs for these virtual machines, and controls the simulation and mapping of these VDEV resources to RDEVs. The operating system in a virtual machine recursively may be another virtualizing operating system and thus provide virtual virtual devices to its virtual virtual machines, etc. Previously, a real PAV DASD could be accessed by virtual machines only when exclusively dedicated RDEVs were used, and only one RDEV could be used by one virtual machine's VDEV. There was no provision for coordinating or optimizing the data flow on behalf of virtual machines with PAV DASD. There remains a need for virtual machines to efficiently access real DASDs in a PAV DASD environment such that a plurality of virtual machines may access Base and Alias DASD RDEVs and VDEVs in both dedicated and minidisk environments. These needs and others that will become apparent are solved by the invention as stated below:

SUMMARY

The embodiments described herein enable parallel, coordinated, and optimized access of real Base and Alias DASDs by one or more virtual machines, each utilizing one or more virtual Base and Alias DASDs. In its simplest embodiment, each of a plurality of virtual machines defines a virtual Base DASD device. The processes described herein coordinate the virtual machine activity on real Base and Alias devices to maximize overall system throughput. In more complex embodiments, one or more virtual machines define one or more virtual Bases and associated virtual Alias devices, wherein the embodiments described coordinate their activity on one or more real Base and Alias devices to maximize overall system throughput.

Thus, what is presented is a method of accessing a digital storage system having a plurality of direct access storage devices; the method comprising the steps of providing a real Base subchannel to a portion or entirety of a direct access storage device; providing at least one real Alias subchannel to a portion or entirety of the direct access storage device; providing a virtual Base subchannel to a portion or entirety of the direct access storage device; and providing at least one virtual Alias subchannel to a portion or entirety of a direct access storage device. The direct access storage device may be accessed in parallel through one or more of the virtual Alias subchannels, one or more of the virtual Base subchannels, and/or through the one or more real Alias subchannels.

Also described herein is a digital information handling system comprising: at least one direct access storage device having a real Base subchannel by which to access the direct access storage device; at least one real Alias subchannel to the direct access storage device connected in a chain with any other real Alias subchannels and with the real Base subchannel; at least one virtual Base subchannel to access the direct access storage device; and at least one virtual Alias subchannel to access the direct access storage device memory subsystem, in which at least one virtual Alias subchannel is connected in a chain with any other virtual Alias subchannels and with the virtual Base subchannel, and the virtual subchannels have a direct pointer to the real Base subchannel to access the direct access storage device. The real and the virtual Base and the Alias subchannels have different permutations of pointers pointing to each other to enable I/O operations in parallel. A plurality of virtual Alias subchannels are able to access the direct access storage device in parallel through the real Base or through one or more Alias subchannels. The digital information handling system may further comprise a central program of an operating system; a plurality of guest operating systems accessing one or more of the plurality of direct access storage devices using one of the plurality of virtual Base subchannels and one or more virtual Alias subchannels, wherein one or more of the guest operating systems can request additional virtual Alias subchannels associated with others of the plurality of guest operating systems.

Further enabled herein is a method of scheduling I/O operations on a computer, wherein an operating system of the computer executes a plurality of I/O operations in parallel on a direct access storage device, the I/O operations originating from a plurality of different virtual machines connected to the operating system.

Finally, a computer program product is presented, the computer program product comprising a computer-usable medium having computer-usable program code to execute parallel I/O operations to a direct access storage device; the computer program product comprising: computer usable program code of a command component to define and control a real environment comprising one or more real Base subchannels and zero or more real Alias subchannels and a virtual environment having one or more virtual machines; computer usable program code of an interpretation component to detect I/O operations requested by the one or more virtual machines; and computer-usable program code of an I/O scheduling component to optimize execution of the I/O operations on the real environment.

DETAILED DESCRIPTION AND PREFERRED EMBODIMENTS

Figure 1:
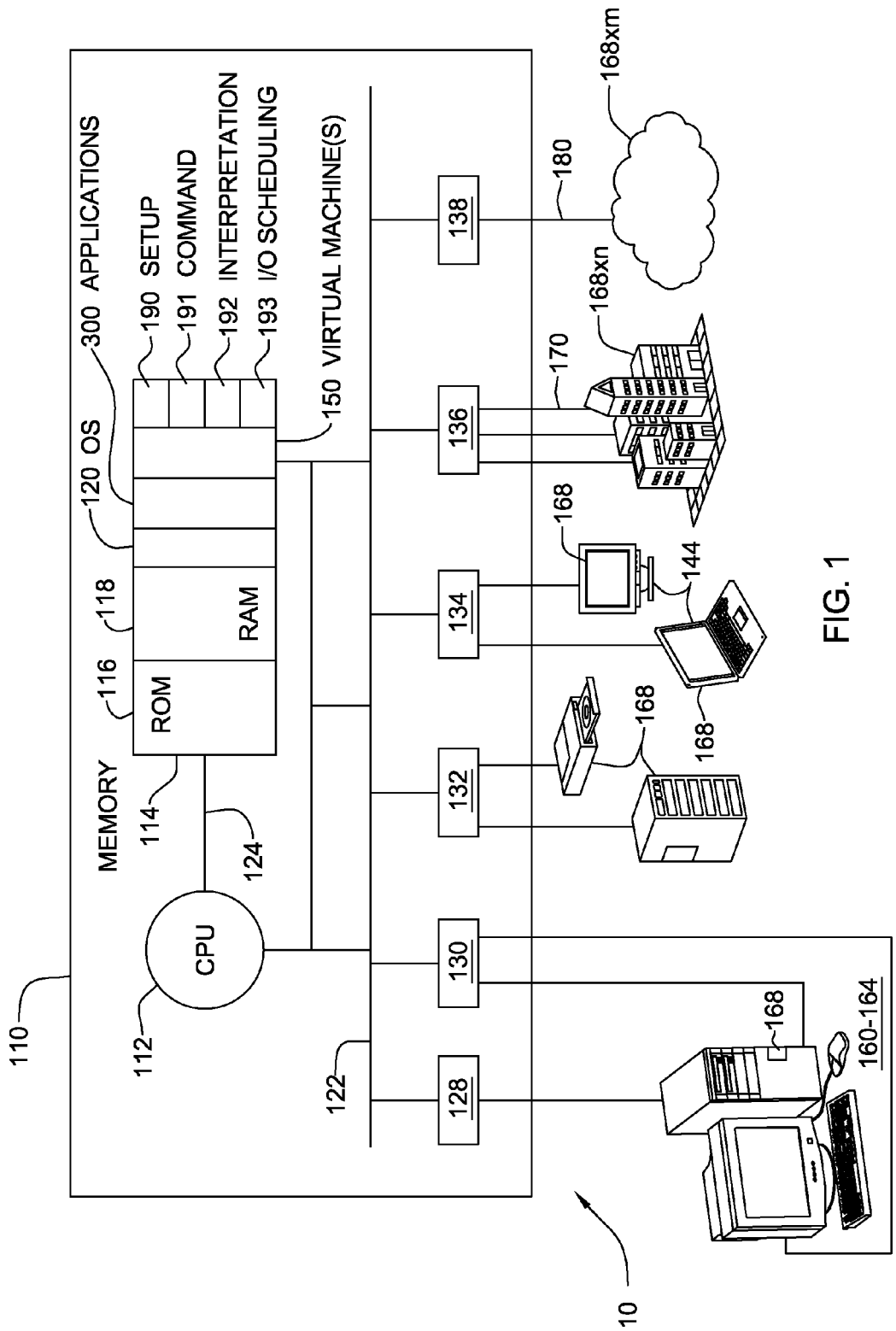
FIG. 1 is a simplified block diagram of a data processing network and machine capable of implementing parallel accesses to DASDs by multiple virtual machines in accordance with an embodiment disclosed herein.

Embodiments of a system, a virtual and a real machine, a method, a service, and a computer program product are described with reference to the accompanying drawings; however, these embodiments may take many different forms and should not be construed as limited to those which are set forth herein. Rather, the illustrated embodiments are provided so that this disclosure is thorough and complete, and fully conveys the scope of the invention to those skilled in the art. Like numbers refer to like elements throughout.

As will be appreciated by one of skill in the art, the embodiments comprise a data processing system, a virtual and a real machine, a method, a computer program product and a service to implement parallel accesses to DASDs in a storage server by multiple virtual machines. Accordingly, the present invention may take the form of a hardware embodiment having hardware components, a computer program product or a software method having components comprising machine-executable instructions, or an embodiment combining software and hardware components. Furthermore, the present invention may take the form of a computer program product on a computer-usable storage medium having computer-usable program code embodied in the medium. Any suitable tangible computer-readable medium may be utilized, including DASDs, CD-ROMs, optical storage devices, or magnetic storage devices.

Computer program source code for implementing parallel accesses to DASDs by multiple virtual machines in accordance with the preferred embodiments described herein may be written in any computer programming language such as the IBM Assembler Language, IBM PL/X, Java, Smalltalk, C, C++ or C#. Object code to implement parallel accesses to DASDs by multiple virtual machines may execute entirely on a single computer or may be distributed throughout a networked system of real and virtual machines connected to many DASDs, and may be especially executing on a storage server, meaning a server whose purpose is only to manage the storage of large amounts of data in very large banks of memory devices. While the object code may be physically located and executing on a single server, it may be connected to the other memory banks, memory devices, other storage servers through any network, such as a local area network (LAN) or a wide area network (WAN), or the connection may be made via the Internet using an Internet Service Provider.

Implementation of parallel accesses to DASDs by multiple virtual machines is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, to create means that implement the functions/acts specified in the flowchart and/or block diagram block or blocks.

These computer program instructions that implement parallel accesses to DASDs by multiple virtual machines may also be stored in a computer-readable memory that can direct a computer or other programmable data processing apparatus to function in a particular manner, such that the instructions stored in the computer-readable memory produce an article of manufacture including instructions which implement the functions/acts specified in the flowchart and/or block diagram block or blocks. The computer program instructions may be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, a high-level block diagram of a computer network system 10 consistent with an embodiment of an information handling system to implement parallel accesses to Base and Alias subchannels for multiple DASDs is shown. Computer network system 10 preferably comprises a number of secure networked computers 110, each of which may have a central processing unit (CPU) 112, memory 114, and various digital and/or analog interfaces 128-138. The various devices communicate with each other via an internal communications bus 122. CPU 112 is a general-purpose programmable processor, executing instructions stored in memory 114; while a single CPU 112 is shown in FIG. 1, it should be understood that computer systems or servers having multiple CPUs are also used and within the scope of computer 110. CPU 112 is capable of executing an operating system 120, applications 300, and virtual machines 150 to implement parallel accesses to Base and Alias subchannels for multiple DASDs 168. CPU 112 is also capable of generating the computer program or the instructions embodying the method to implement parallel accesses to Base and Alias subchannels embodied within bus 122 and interface 132 for multiple DASDs 168, is capable of receiving and transmitting the program instructions embodying the method and program to implement parallel accesses to Base and Alias subchannels for multiple DASDs 168, and is capable of executing components 190-193. Communications bus 122 supports subchannels that enable the transfer of data, commands and other information between different devices, and while shown in simplified form as a single bus, it is typically structured as multiple buses including an internal bus 124 which may connect the CPU 112 directly with memory 114.

Memory 114 comprises a read only memory (ROM) 116 and a random-access memory (RAM) 118 for storing the operating system 120, the method and program to implement parallel accesses to Base and Alias subchannels for multiple DASDs 168, the other components 190-193, and other data and programs. Typically, those portions or programs, routines, modules of the operating system 120 necessary to "boot up" are stored in ROM 116. RAM 118 typically stores programs and data that will be erased when the computer turns off. Memory 114 is shown conceptually as a single monolithic entity but it is well known that memory is often arranged in a hierarchy of caches and other memory devices, some or all of which may be integrated into the same semiconductor substrate as the CPU 112. RAM 118 devices comprises the main storage of the computer, as well as any supplemental levels of memory, e.g., cache memories, nonvolatile or backup memories, programmable or flash memories, other read-only memories, etc. In addition, memory 114 may be considered to include memory storage physically located elsewhere in computer, e.g., other DASDs, a cache memory in a processor or other storage capacity used as a virtual memory, or preferably a mass storage device having multiple DASDs 168 or on another computer 110 coupled to computer via a network. The memory of 118 may be addressed as virtual memory by virtual machines 150 under the control of an operating system 120. In the context herein, a memory location 114 is intended to include, but not be limited to, nonvolatile or backup memories or a programmable or flash memories, read-only memories, etc., in one or more devices physically located on a different computer, client, server, or other hardware memory device, such as a mass storage device 168 or on another computer coupled to computer via network. Memory location 114 may comprise remote archival memory such as one or more DASD devices such as rotating magnetic hard disk units, tape or optical drives, floppy or other removable disk drives, such as compact disk (CD) drive, a digital video disk (DVD) drive, etc., among others.

Operating system 120 and components having program instructions for implementing parallel access to DASDs 168 by multiple virtual machines 150 and other applications 300 reside in memory 114. Operating system 120 provides internal functions such as device interfaces, management of memory pages, management of multiple tasks, etc. as is known in the art. Examples of such operating systems may include Linux, AIX, Unix, Windows, System X, z/OS, z/VM, OS/400, an RTos, a handheld operating system, etc. These operating systems 120 and other various software components 190-193 to implement parallel accesses to DASDs 168 by multiple virtual machines 150, and other applications, components, programs, objects, modules, etc. may also execute on one or more processors in another computer coupled to computer 110 via a network 170, 180, e.g., in a distributed or client-server computing environment, whereby the processing required to implement the functions of a computer program may be allocated to multiple computers, also called servers, 110 over a network 170, 180, often referred to as a remote connection. Operating system 120 may also create other virtual machines 150 with virtual operating systems 120 for individual users to remotely access the computer 110 and its resources.

In general, software components to implement parallel accesses to DASDs 168 by multiple virtual machines 150 execute within the CPU 112 to implement the embodiments of the invention, and can be implemented as part of an operating system 120, a specific application, component 190-193, program, object, module, sequence of instructions or as part of a virtual machine 150 and its virtual operating system 120; all of which may simply be referred to herein as computer programs, programs, or components. Implementing parallel accesses to DASDs 168 by multiple virtual machines 150 typically comprises the execution of one or more instructions that are resident at various times in various memory and storage in a device and that, when read and executed by one or more processors in the computer 110, cause that computer 110 to perform the steps necessary to execute steps or elements embodying the various aspects of the invention. Implementing parallel accesses to DASDs 168 by multiple virtual machines 150 under the control of an operating system 120 comprises a setup component 190 that establishes security constraints and the real and virtual environments, a command component 191 that is used to interrogate, define, modify, and control the real and virtual environments, an interpretation component 192 that monitors the execution of virtual machines and detects virtual I/O requests and enforces security controls, and an I/O scheduling component 193 that optimizes the real I/O flowing over the real Base and Alias subchannels.

It should be appreciated that computer 110 typically includes suitable analog and/or digital interfaces 128-138 between CPU 112 and the attached components as is known in the art. For instance, computer 110 typically receives a number of inputs and outputs for communicating information externally. For interface with a user, computer 110 typically includes one or more user input devices 160-164, e.g., a keyboard, a mouse, a trackball, a joystick, a touchpad, and/or a microphone, among others, and a display such as a CRT monitor, an LCD display panel, and/or a speaker, among others. It should be appreciated, however, that some implementations of computer 110, e.g., some server implementations, might not support direct user input and output. Terminal interface 134 may support the attachment of single or multiple terminals 144 and may be implemented as one or multiple electronic circuit cards or other units. Data storage 168 preferably comprises one or more DASD devices, previously described. Data storage 168 may be stored on remote storage devices of different computers 110 located on the Internet 180, a WAN 170, and other connected machines 110. One of skill in the art will further anticipate that the interfaces 128-138 may also be wireless.

Furthermore, computer 110 may include an interface 136, 138 with one or more networks 170, 180 to permit the communication of information with other computers and virtual machines 110 coupled to the network(s) 170, 180. Network interface(s) 136, 138 provides a physical and/or wireless connection for transmission of data to and from a network(s) 170, 180. Network(s) 170, 180 may be the Internet, as well as any smaller self-contained network such as an Intranet, a wide area network (WAN), a local area network (LAN), or other internal or external network using, e.g., telephone transmissions lines, satellites, fiber optics, T1 lines, wireless, public cable, etc. and any various available technologies. One of ordinary skill in the art understands that computer 110 may be connected to more than one network 170, 180 simultaneously. Computer system and remote systems 110 are intended to encompass, but not be limited to, virtual machines, desktop or laptop or other mobile personal computers, workstations, minicomputers, midrange computers, and mainframe computers. Any number of virtual and real computers and other microprocessor devices, such as personal handheld computers, personal digital assistants, wireless telephones, etc., which may not necessarily have full information handling capacity as the large mainframe servers, may also be networked through network(s) 170, 180. Still yet, any of the components of the method and program products shown in the embodiments of FIG. 1 through FIG. 5 could be deployed, managed, serviced by a service provider who offers to perform one or more of the process steps implementing parallel accesses to DASDs 168 by multiple virtual machines 150.

Figure 2:
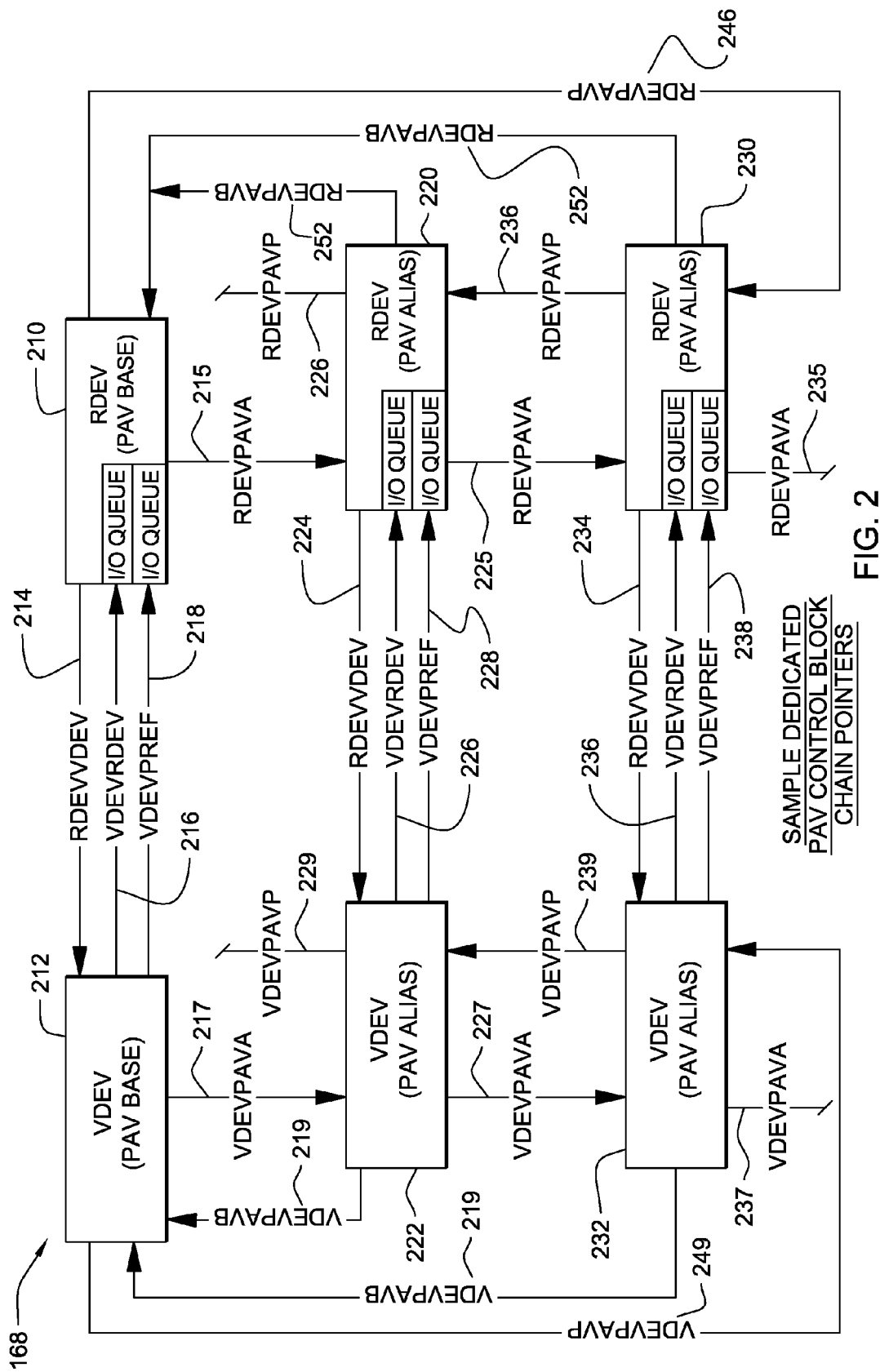
FIG. 2 is a control block diagram of parallel access of dedicated DASDs.

With reference to FIG. 2, there is shown a representation of the operating system 120 and hardware control structures 122,132 that may be used to describe and access a DASD subsystem 168 of a computer system 110; the DASD subsystem 168 is characterized by at least one real DASD device 210, or more correctly, a Base RDEV 210 through which access to a real DASD device is permitted. There are two alternate RDEVs, represented as Alias RDEVs 220, 230 that are actual alternative hardware I/O queues and subchannels to the real DASD device 210.

FIG. 2 is an example of a virtual machine 150 environment wherein the real DASD 168 is exclusively dedicated to at most one virtual machine. Only a single virtual machine 150 can access Base RDEV 210 when it is dedicated to the virtual machine. Only the same virtual machine 150 can access Alias RDEVs 220, 230 when Base RDEV 210 is dedicated the virtual machine. A plurality of Base RDEVs 210 and their associated Alias RDEVs 220, 230 may be dedicated to a single virtual machine 150. A plurality of virtual machines 150 may access different dedicated DASD 168 simultaneously. Guest operating systems using dedicated PAV support within the virtual machines must be PAV aware, meaning that the guest operating system is responsible for scheduling its I/O operations on its Base and Alias VDEVs. Multiple operating systems 120, moreover, may share the same Base and Alias RDEVs among PAV aware Operating Systems 120 and/or virtual machines 150.

When a Base RDEV 210 is dedicated (FIG. 2), its RDEV-VDEV (for Real DEVice to Virtual DEVice) pointer 214 will point to the virtual machine's Base VDEV 212, and the Alias RDEVs 220, 230 of that Base RDEV 210 will have respective RDEVVDEV pointers 224, 234 pointing to the virtual machine's Alias VDEVs 222, 232. On the virtual side, the VDEVRDEV pointers 216, 226, 236 point back to each respective Base RDEV 210 or Alias RDEVs 220, 230. The VDEVRDEV pointers indicate the RDEV to which I/O will be queued. The Base RDEV 210 has a forward linked-list pointer, RDEVPAVA 215, to its associated Alias RDEV 220 which in turn has a pointer, RDEVPAVA 225, to the next Alias RDEV 230 which in turn may have a pointer, RDEVPAVA 235, to the next Alias RDEV (not shown) and so on. The Base RDEV 210 also has a reverse linked-list pointer, RDEVPAVP 246, to the last Alias RDEV 230 which in turn points, via RDEVPAVP 236, to the next to the last Alias RDEV 220 and so on. Thus, the Base RDEV 210 maintains head and tail pointers to a double-linked list of Alias RDEVs 220, 230 associated with this Base RDEV, which is used to rapidly move Alias RDEVs from one Base RDEV to another, if needed. Each Alias RDEV also points to its associated Base RDEV via pointers RDEVPAVB 252.

Similarly, for both the dedicated and non-dedicated instances, the arrangement of pointers is replicated with the Base and Alias VDEVs. The Base VDEV 212 has a forward link-list pointer, VDEVPAVA 217, to its associated Alias VDEV 222 which in turn has a pointer, VDEVPAVA 227, to the next Alias VDEV 232 which in turn may have a pointer VDEVPAVA 237 to the next Alias VDEV (not shown) and so on. The Base VDEV 212 also has a reverse linked-list pointer VDEVPAVP 249 to the last Alias VDEV 232 which in turn points, via VDEVPAVP 239, to the next to the last Alias VDEV 222 and so on. Thus, the Base VDEV 212 maintains head and tail pointers to a double-linked list of Alias VDEVs 222, 232 associated with this Base VDEV, which is used to rapidly move Alias VDEVs from one Base VDEV to another, if needed. Each Alias VDEV also points to its associated Base VDEV via pointers VDEVPAVB 219.

Each Base or Alias VDEV also points to its respective RDEV, with preferred pointers 218, 228, 238. The purpose of the preferred RDEV is to provide consistent responses to particular I/O requests as will be described next:

Certain VDEV I/O operations, such as those that obtain low-level configuration information and perform device-wide control functions, must be consistently executed against the same Base or Alias RDEV when repeatedly executed on a Base or Alias VDEV. In these cases the same Base or Alias RDEV is found via the VDEVPREF 218, 228, 238 pointers. The VDEVPREF pointer consistently points from the Base VDEV and the Alias VDEVs to their respective Base RDEV and Alias RDEVs. Each Base RDEV and Alias RDEV contains the true configuration data for the underlying device that was retrieved during device initialization or dynamic reconfiguration and this true configuration data will be consistently returned in each response. The response may also be modified, tempered, or simulated based on the virtual machine's configuration.

Figure 3:
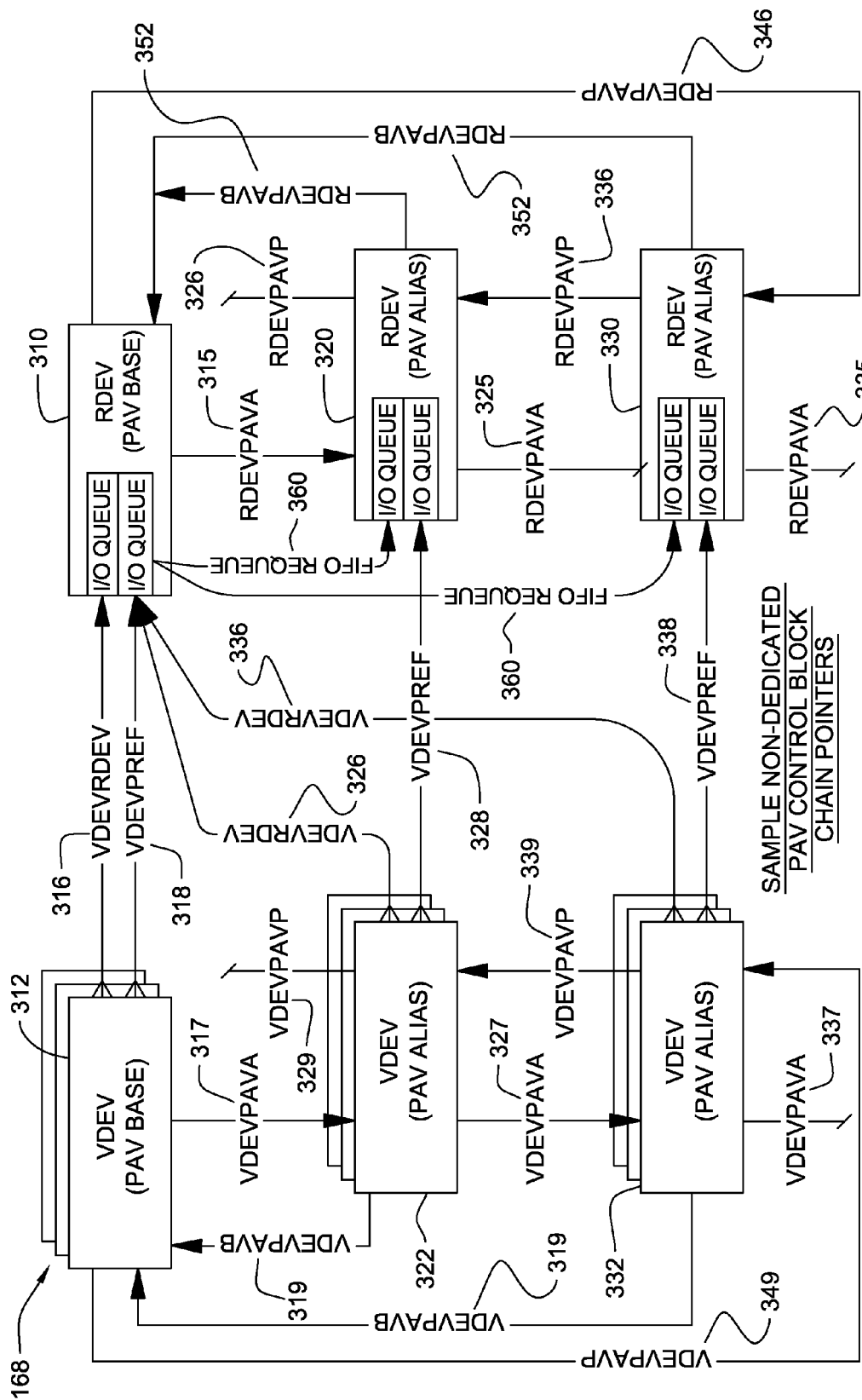
FIG. 3 is a control block diagram of parallel access of multiple minidisk DASDs when the real DASD is not dedicated. It is suggested that FIG. 3 be printed on the face of the patent.

FIG. 3 is an example of a non-dedicated virtual machine 150 environment wherein the real DASD 168 may be subdivided into minidisks and may be shared with a plurality of virtual machines. Note the differences illustrated in FIG. 3: the Base VDEV 312 need not be exclusively associated with the Base RDEV 310, and the Alias VDEVs 322, 332 need not be exclusively associated with the Alias RDEVs 320, 330. The RDEVVDEV 214, 224, 234 pointers are not used since there may be a plurality of VDEVs defined for each RDEV. The operating system allows any number of virtual machines to access a single DASD. Some or all of a DASD, moreover, may be allocated to a particular virtual machine. Each virtual machine may have a plurality of Base VDEVs and a plurality of associated Alias VDEVs wherein the number of Alias VDEVs can be up to the number of Alias RDEVs, but the number of Alias VDEVs cannot be more than the number of Alias RDEVs. The machine, system, computer program product, and service described herein enables a Base VDEV 312 and associated Alias VDEVs 322, 332 of a virtual machine to access not only the Base RDEV 310, whether it is assigned an entire DASD or just a portion of the DASD, but also any Alias RDEV 320, 330 of Base RDEV 310. The operating system accomplishes this by having the Base VDEV 312 and each Alias VDEV 322, 332 queue I/O requests to the Base RDEV 310 via the VDEVRDEV 316, 326, 336 pointers. The I/O request will be queued first to a Base RDEV device 310. If the Base RDEV 310 is busy, the I/O request is re-queued 360 to an Alias RDEV 320, 330 until one of them is found available for parallel access I/O. Thus, virtual machines may obtain the benefit of parallel access volumes wherein the operating system is able to interleave I/O requests from a plurality of virtual machines, each with a plurality of dedicated and minidisk Base and Alias VDEVs, that are queued to an I/O queue that is efficiently serviced in parallel by Base and Alias RDEVS. In an environment where there are a number of virtual machines each having their own minidisk apportioned from the whole real DASD, there is no need for the virtual machine to select whether a Base RDEV or a particular Alias RDEV is used for a particular Base or Alias VDEV I/O operation. The benefit is that non-exploiting or non PAV-aware guest operating systems within virtual machines are still able to realize the advantages of parallel access volumes.

In a minidisk environment, the central program of an operating system may exploit parallel access by interleaving I/O access requests from the many virtual machines having Base and Alias VDEVs along with its own I/O operations. Parallel access by the operating system to its Base and Alias RDEVs and its virtual machine's Base and Alias VDEVs may be used to access permanent storage space (PERM), the spool area (SPOL) of the operating system's DASD space that handles printing; a paging area (PAGE) where virtual memory is temporarily stored; a user directory area (DRCT) of the DASD storing user ids and configurations; and temporary storage (TEMP), among others.

Virtual machine I/O operations are queued to a Base or Alias VDEV 212, 222, 232, 312, 322, 332 by the operating system 120 executing in virtual machine 150. The process steps which are described below in explanation of FIGS. 4 and 5 describe the overall logic used to service such VDEV requests and possibly select an appropriate RDEV to execute the operation. Normally, Base and Alias VDEV I/O requests are queued to the RDEV pointed to by the VDEVRDEV pointer. In the dedicated case these are the Base RDEV 210 and Alias RDEVs 220, 230 and no further RDEV selection is performed. In the non-dedicated, minidisk case the I/Os are normally all queued to Base RDEV 310 since VDEVs 312, 322, 332 all point to it via their VDEVRDEV pointers. There are two situations, however, when the I/O is queued to the RDEV pointed to by VDEVPREF 218, 228, 238, 316, 328, 338: (a) when an I/O operation requires the I/O operation to be executed against a Base real device, such as a Reserve, Release or Unconditional Reserve command; or (b) when an I/O operation is required to be consistently executed on a specific Base or Alias RDEV, such as the Read Configuration Data command.

Figure 4:
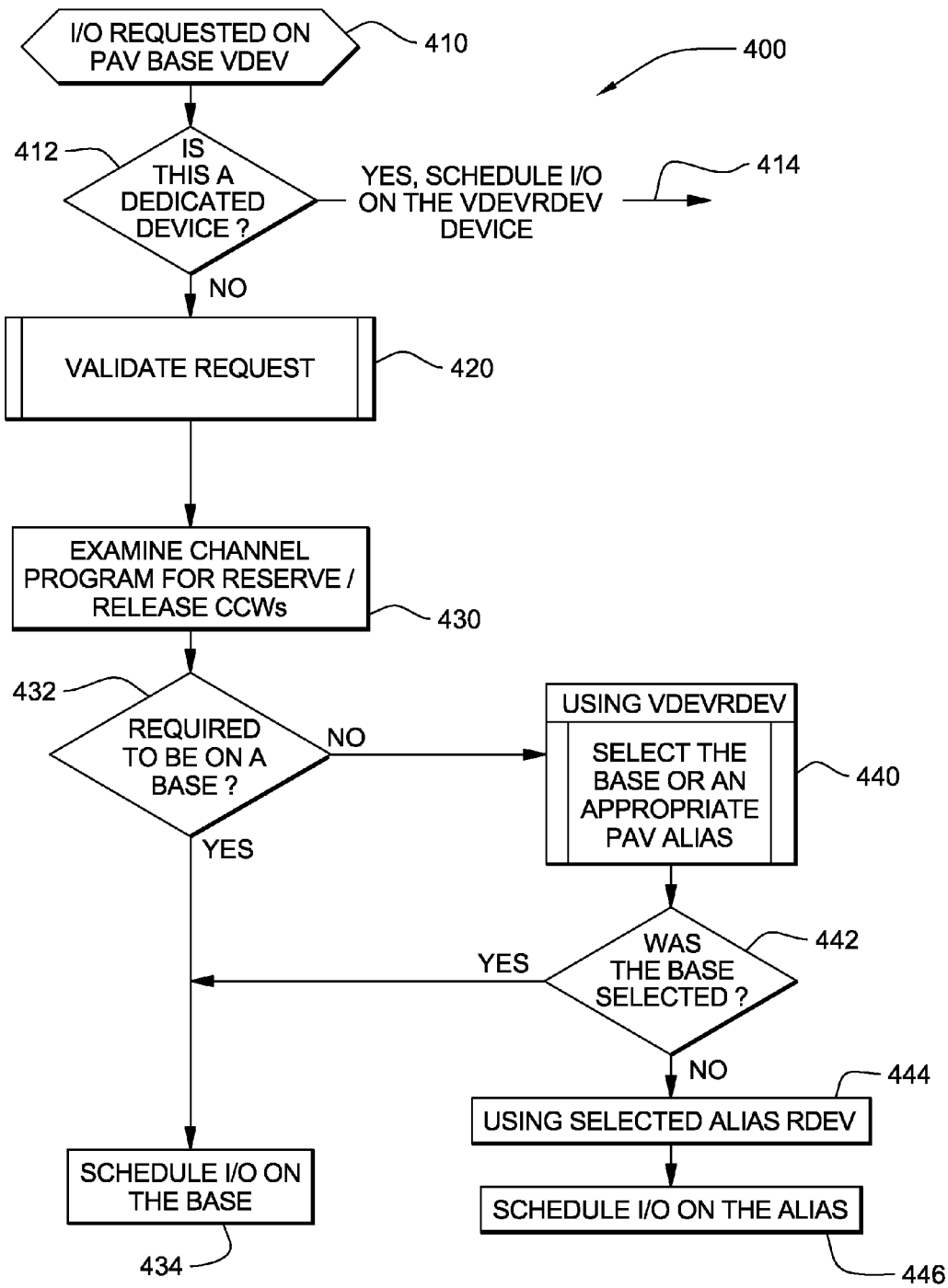
FIG. 4 is a simplified flow chart of the steps of the procedure used to access Base PAV subchannels.

The flow chart in FIG. 4 provides an illustration of the process steps when an I/O access request is accepted from a Base VDEV to select a real device, whether a Base RDEV or an Alias RDEV, to perform the operation. In block 410 an input/output (I/O) request from a virtual machine has been received on a Base VDEV 212 or 312. In block 412 a check is made for an I/O request on dedicated Base VDEV 212 and if so, the I/O is driven to the Base RDEV pointed to by VDEVRDEV 216. If not, then the I/O request was from Base VDEV 312 and at step 420, there is a validation request to determine if the Base VDEV 312 is valid corresponding to the virtual machine/operating system making the I/O request. Presuming that the request is valid at step 420, the request is then checked at block 430 to see if the I/O request is one that must execute on the Base RDEV 310. Recall that certain I/O operations must be performed on the Base RDEV, such as reserving or releasing a device (Device Reserve, Device Release, Unconditional Reserve, Reset Allegiance in the z/VM operating system). If the I/O request is one of those that must execute on the Base RDEV 310 432, then in block 434 the I/O access is scheduled on the Base RDEV 310. These I/O operations will be flagged as invalid if issued to an Alias VDEV.

If, however, the I/O command need not be executed on the Base RDEV 310 at block 432, then at block 440, using the pointer VDEVRDEV 318 from the Base VDEV 312 to the Base RDEV 310, the Base RDEV 310 or, via its RDEVPAVA 315 chain, an Alias RDEV 320, 330 is selected at block 440. If the Base RDEV 310 was selected at block 442, then the I/O is scheduled on the Base RDEV 310 as in block 434. If, however, the real Base 310 was not selected at block 442, then an Alias RDEV 320, 330 may be selected at block 444. Thus, a non-dedicated, minidisk I/O request on Base VDEV 312 may be executed on Base RDEV 310 or Alias RDEVs 320, 330 in many cases.

Figure 5:
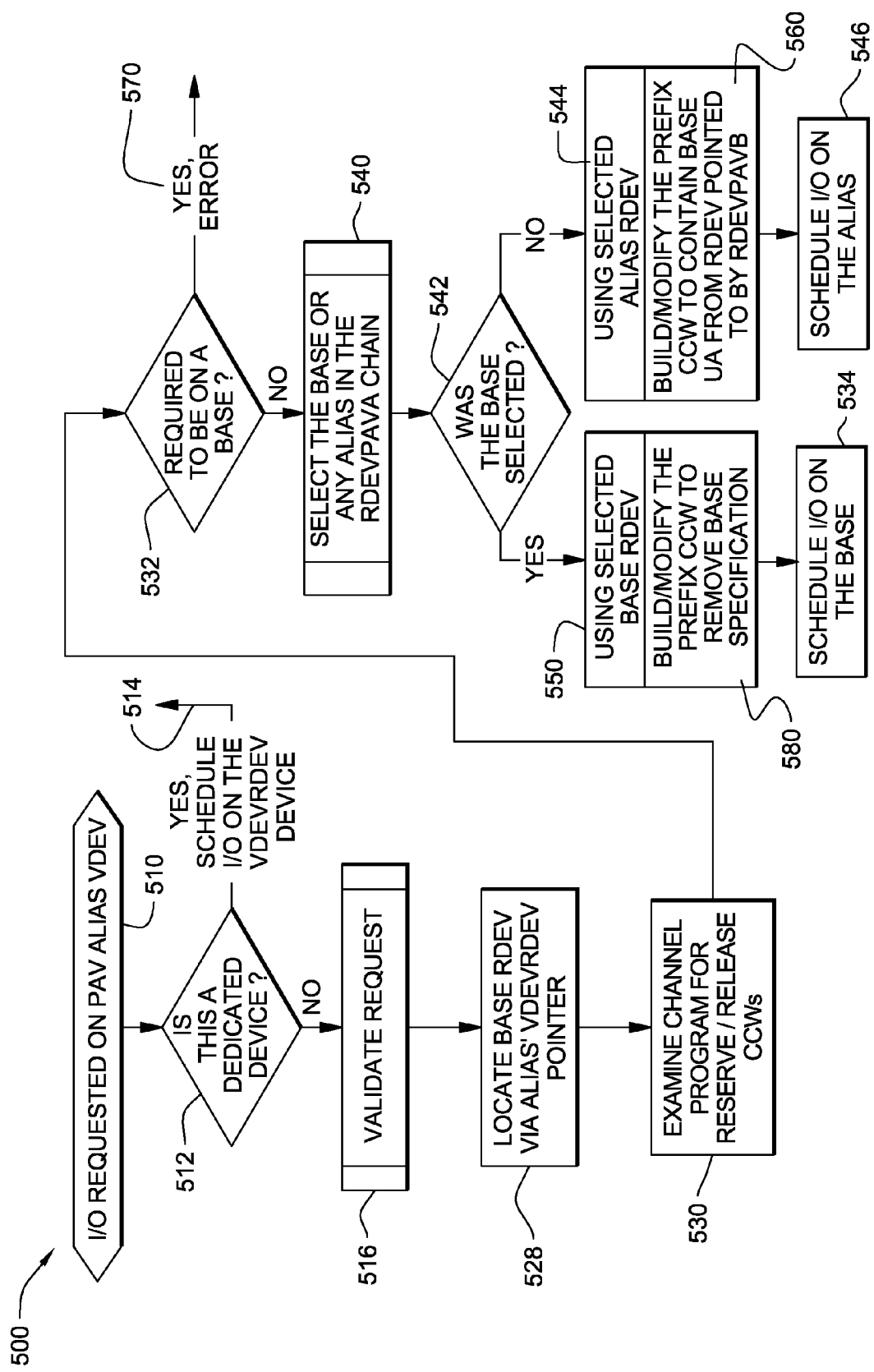
FIG. 5 is a simplified flow chart of the steps of the procedure used to access Alias PAV subchannels.

The flow chart of in FIG. 5 provides an illustration of the process steps when an I/O access request is accepted from an Alias VDEV to select a real device, whether a Base RDEV or an Alias RDEV, to perform the operation. In block 510 an input/output (I/O) request from a virtual machine has been received on Alias VDEV 222, 232, 322, or 332. In block 512 a check is made for an I/O request on dedicated Alias VDEV 222, 232 and if so, the I/O is queued 514 to the Alias RDEV pointed to by VDEVRDEV 226, 236. If not, then the I/O request was from Alias VDEV 322, 332 and at step 516, there is a validation request to determine if the Alias VDEV 322, 332 is valid corresponding to the virtual machine/operating system making the I/O request. Also, in validation step 516 an optional check may be made to verify that Alias VDEV 322, 332 is still associated with Base VDEV 312. In step 528 Base RDEV 310 is located by the VDEVRDEV pointer 326, 336.

After the Base RDEV 310 has been determined in step 528 using an Alias VDEV's VDEVRDEV pointer, then at block 530, the I/O command is examined to determine if the I/O operation is one that must be executed on the Base VDEV 312, as described above with respect to Reserve, Release and other I/O commands. If the I/O operation must be executed on Base VDEV 312 a virtual machine error is simulated as in block 570 because the operation would otherwise not be possible given the PAV hardware architecture of the DASD.

If the Alias VDEV 322, 332 I/O command, however, need not be executed on the Base RDEV 310 in block 532, then in step 540, the Base RDEV 310 or any of the Alias RDEV 320, 330 in the RDEVPAVA chain may be selected to execute the operation. If the Base RDEV is selected in block 542, then in step 550, using the selected Base RDEV 310, a Prefix channel command is built or modified 580 to indicate Base operation and the I/O command is scheduled on the Base RDEV 310 in step 534. If, however, in step 542, the Base RDEV 310 is not selected, then in step 544, using any selected Alias RDEV 320, 330, the Prefix channel command is built or modified 560 to contain the Base RDEV's unit address to verify that the Alias RDEV 320, 330 and the Base RDEV 310 are still correlated to one another and the I/O command is scheduled on the Alias RDEV 320, 330, as in step 546.

In order to implement parallel accesses to Base and Alias VDEVs for multiple Base and Alias RDEVs, there are changes to be made to the commands and directory of the operating system. The following examples are commands in the z/VM operating system; one of skill in the art will understand that commands that accomplish the same functions in other operating systems may have other names and descriptions.

The ability to define, configure, interrogate, and control Base and Alias RDEVs and VDEVs is addressed. The definition of Base VDEVs is accomplished by the use of the ATTACH, LINK, DEFINE MDISK and DEFINE TDISK console commands as well as the DEDICATE, LINK, and MDISK directory statements. In the preferred embodiment herein, the definitions of Alias VDEVs are accomplished with the ATTACH and DEFINE PAVALIAS console commands as well as the DASDOPT and MINIOPT directory statements.

The ATTACH rdev vdev console command, which creates a dedicated arrangement, is extended to allow the specification of an aliasrdev and aliasvdev. The Alias VDEV 222, 232 is created to represent the specified aliasvdev and connected to the specified aliasrdev, Alias RDEV 220, 230. The appropriate RDEVVDEV 224, 234, VDEVRDEV 226, 236, and VDEVPREF 228, 238 are created. Additionally, appropriate VDEVPAVA 217, 227, 237, VDEVPAVP 229, 239, 249, and VDEVPAVB 219 pointers are created by following the specified Alias RDEV's 220, 230 RDEVPAVB 252 pointer to locate the Base RDEV 210 and in turn following its RDEV-VDEV 214 pointer to locate the Base VDEV 212. The aliasrdev Alias RDEV 220, 230, its Base RDEV 210 and Base VDEV 212 must exist prior to the execution of the command.

The DEFINE PAVALIAS aliasvdev FOR BASE basevdev is defined for the minidisk arrangement: The Alias VDEV 322, 332 is created to represent the specified aliasvdev and connected to the specified basevdev Base VDEV 312. The Base RDEV 310 is located by following the specified Base VDEV's 312 VDEVRDEV 318 pointer. Using the Base RDEV's 310 RDEVPAVA 315,325,335 forward linked-list, a candidate Alias RDEV 320, 330 is located. Next, using the specified Base VDEV's 312 VDEVPAVA 317, 327, 337 forward linked-list, a search is made for any Alias VDEV 322, 332 whose VDEVPREF 328, 338 points to the candidate Alias RDEV 320, 330. If there is a match then the current candidate is rejected and a new candidate is located from the current candidate's RDEVPAVA 325, 335 pointer and the above process is repeated. If there are no suitable candidates available then the command fails because the operating system is unable to locate a unique Alias RDEV. If a candidate is accepted then the Alias VDEV 322, 332 is created and its VDEVPREF 328, 338 pointer is set to the candidate Alias RDEV 320, 330. Thus, we have a unique association between the Alias VDEVs 322, 332 and Alias RDEVs 320, 330, expressed by the VDEVPREF 228, 238 pointers. This also is why there may not be more Alias VDEVs 322, 332 than Alias RDEVs 320, 330 for a given Base VDEV 312 - Base RDEV 310 pair. Additionally, appropriate VDEVPAVA 317, 327, 337, VDEVPAVP 329, 339, 349, and VDEVPAVB 319 pointers are created using the specified Base VDEV 312. The VDEVRDEV 336 pointer of the newly created Alias VDEV 322, 332 is copied from the specified Base VDEV's 312 VDEVRDEV 318 pointer. Thus, the Base VDEV 312 and all its Alias VDEV's 322, 332 point to the Base RDEV 310 via their VDEVRDEV 318, 326, 336 pointers.

The configuration of a virtual machine may also be stored in a directory. During virtual machine creation the directory is processed and virtual devices are created. The DEDICATE vdev rdev statement creates a dedicated environment with a Base RDEV 210-Base VDEV 212 pair. In the preferred embodiment the DEDICATE vdev rdev statement is extended to allow the specification of an aliasvdev aliasrdev pair. The process of creation is as if the ATTACH aliasvdev aliasrdev console command were issued.

The LINK vdev1 vdev2 and MDISK vdev devtype statements created a non-dedicated, minidisk environment with a Base RDEV 310-Base VDEV 312 pair. The DASDOPT and MINIOPT statements specify options for full-pack and non-full-pack minidisks respectively that were defined with the LINK and MDISK statements. In the preferred embodiment, the DASDOPT and MINIOPT statements are extended to provide for the creation of Alias VDEVs 322, 332 for Base VDEV 312. The LINK and MDISK statements specify the basevdev and the subsequent DASDOPT and MINIOPT statements specify the aliasvdev(s) that are to be created. The process of creation is as if the DEFINE PAVALIAS aliasvdev FOR basevdev console command were issued.

By way of example only, a Base RDEV has three Alias RDEVs, and a Base VDEV device is defined with a request for four Alias VDEVs. One of the Alias VDEVs cannot be created because there are not enough Alias RDEVs to map the VDEVPREF 328, 338 pointers, so I/O operations to the Base VDEV 312 and the Alias VDEVs 322, 332 will only be arbitrarily directed toward Base RDEV 310 and Alias RDEVs 320, 330.

To facilitate interrogation of the real and virtual PAV configuration the preferred embodiment implements two commands: QUERY PAV and QUERY VIRTUAL PAV. The QUERY PAV command response provides sufficient information to convey the state of Base RDEVs 210, 310 and Alias RDEVs 220, 230, 320, 330. The associations among these are displayed as well. The QUERY VIRTUAL PAV command response provides sufficient information to convey the state of Base VDEVs 212, 312 and Alias VDEVs 222, 232, 322, 332 and their preferred assignments with Base RDEVs 210, 310 and Alias RDEVs 220, 230, 320, 330 via their VDEVPREF 218, 228, 238, 316, 328, 338 pointers.

It will be appreciated that variations of some elements are possible to adapt the invention for specific conditions or functions. The concepts of the present invention can be further extended to a variety of other applications that are clearly within the scope of this invention. Having thus described the present invention with respect to preferred embodiments as implemented, it will be apparent to those skilled in the art that many modifications and enhancements are possible to the present invention without departing from the basic concepts as described in the preferred embodiment of the present invention. Therefore, what is intended to be protected by way of letters patent should be limited only by the scope of the following claims.

What is claimed is:

1. A method of accessing a digital storage system having a plurality of direct access storage devices, the method comprising the steps of:
   providing a plurality of real subchannels to perform multiple concurrent input/output operations to one or more of the plurality of direct access storage devices; and
   enabling a plurality of virtual subchannels to access the direct access storage device through the plurality of real subchannels, each single one of the plurality of virtual subchannels using multiple real subchannels that access the direct access storage device in parallel.

2. The method of claim 1, further comprising providing a plurality of virtual Alias subchannels wherein all of the virtual Alias subchannels are used by more than one virtual machine to access the digital storage system.

3. The method of claim 2, further comprising accessing the portion of the direct access storage device through a real Base subchannel.

4. The method of claim 1, further comprising:
   accessing the plurality of direct access storage devices as a real parallel access volume by simulating the parallel access volume as a virtual parallel access volume for parallel use by one or more virtual machines.

5. The method of claim 4, wherein the virtual parallel access volume is a non-dedicated parallel access volume for parallel use by a plurality of virtual machines.

6. The method of claim 4, wherein the virtual parallel access volume is a dedicated virtual parallel access volume for parallel use by a single virtual machine.

7. The method of claim 4, further comprising:
   allocating, controlling, and configuring the direct access storage devices as a plurality of real parallel access volumes; and
   provisioning the plurality of real parallel access volumes to a plurality of virtual machines as virtual parallel access volumes.

8. A digital information handling system comprising:
   at least one direct access storage device having a real Base subchannel by which to access the direct access storage device;
   at least one real Alias subchannel to the direct access storage device connected in a chain with any other real Alias subchannels and with the real Base subchannel, the at least one real Alias subchannel accessing the direct access storage device in parallel with the real Base subchannel and with any other real Alias subchannels;
   at least one virtual Base subchannel to access the direct access storage device;
   at least one virtual Alias subchannel to access the direct access storage device memory subsystem, the at least one virtual Alias subchannel connected in a chain with any other virtual Alias subchannels and with the virtual Base subchannel, the at least one virtual Alias subchannel having a direct pointer to the real Base subchannel to access the direct access storage device whereby one virtual Alias subchannel accesses the direct access storage device in parallel using multiple real subchannels associated with the one virtual Alias subchannel.

9. The digital information handling system of claim 8, wherein the at least one virtual Alias subchannel further comprises a pointer to at least one real Alias subchannel.

10. The digital information handling system of claim 9, further comprising a plurality of virtual Alias subchannels, each of the virtual Alias subchannels able to access the direct access storage device through the real Base or through one or more real Alias subchannels in parallel.

11. A digital information handling system, further comprising:
   a central program of an operating system;
   a plurality of guest operating systems accessing one or more of a plurality of direct access storage devices through one of a plurality of virtual Base subchannels and one or more virtual Alias subchannels wherein a single virtual subchannel accesses the direct access storage devices in parallel using a plurality of Real subchannels;
   wherein the one or more of the guest operating systems can request additional virtual Alias subchannels associated with others of the plurality of guest operating systems.

12. The information handling system of claim 11, wherein the additional virtual Alias subchannels accommodate a plurality of I/O requests from the one or more guest operating systems even though an actual rate of processing I/O requests on a real Base subchannel and zero or more real Alias subchannels remain unchanged.

13. The information handling system of claim 11, wherein the central program of the operating system is executing on a computer remotely connected to the plurality of direct access storage devices over a network.

14. The information handling system of claim 13, wherein at least one guest operating system is executing on a computer remotely connected to the computer upon which the central program is executing, and also remotely connected to the plurality of direct access storage devices.

15. A method of scheduling I/O operations on a computer, comprising an operating system of the computer executing a plurality of I/O operations on a direct access storage device having a plurality of real subchannels accessing the direct access storage device in parallel, the I/O operations originating from a plurality of different virtual machines connected to the operating system, each virtual machine to access the direct access storage device in parallel using more than one real subchannel.

16. A computer program product comprising a tangible computer-usable storage medium having computer usable program code to access a direct access storage device, the computer program product comprising:
   computer usable program code to define and control a real environment comprising one or more real subchannels to access the direct access storage device in parallel, and a virtual environment having one or more virtual machines;
   computer usable program code to detect I/O operations requested by the one or more virtual machines,
   computer usable program code to schedule and optimize execution of the I/O operations on the real environment so that the one virtual machine performs I/O operations in parallel using more than one of the real subchannels associated with the one virtual machine.

17. The computer program product of claim 16, further comprising computer usable program code to establish the virtual environment and establish security constraints.

* * * * *